United States Patent [19]

Lauderdale

[11] 4,136,904
[45] Jan. 30, 1979

[54] UNDERHOOD TOOL AND STORAGE COMPARTMENT

[76] Inventor: Clifton H. Lauderdale, Rte. #1, Caldwell, Tex. 77836

[21] Appl. No.: 818,739

[22] Filed: Jul. 25, 1977

[51] Int. Cl.² .......................... B60R 5/00; B60R 7/00
[52] U.S. Cl. ............................. 296/37.1; 224/42.42 R
[58] Field of Search ............... 296/37.1, 37.6; 108/23; 312/DIG. 33; 224/42.42 R, 42.43, 42.45 R, 29 R, 42.01

[56] References Cited
U.S. PATENT DOCUMENTS

| | | |
|---|---|---|
| 1,368,432 | 2/1921 | Hahn .............................. 224/42.42 R |
| 1,422,763 | 7/1922 | Hollis ................................. 296/37.1 |
| 1,490,657 | 4/1924 | Botella ........................... 224/42.42 R |
| 2,979,190 | 4/1961 | Daigle ................................ 224/29 R |

Primary Examiner—Richard A. Bertsch
Attorney, Agent, or Firm—Robert D. Farkas

[57] ABSTRACT

A tool and storage compartment adapted to be affixed under the hood of vehicles to the internal surface of the fender wheel cover includes an elongated body and a hinged cover thereon with illumination means disposed thereon activated when opened. The body is provided with an electrical receptacle coupled to the vehicle battery for use with external appliances.

9 Claims, 4 Drawing Figures

UNDERHOOD TOOL AND STORAGE COMPARTMENT

BACKGROUND OF THE INVENTION

1. Field of the Invention

The present invention relates to tool boxes, and in particular, to a tool box and storage compartment adapted to be affixed under the hood of vehicles to the internal surface of the fender wheel cover.

2. Description of the Prior Art

For many years owners of vehicles have been in the need for a convenient and safe place for storing hand tools in order to have them available when repairs to the vehicle are required. This especially is true on farms and ranches in particular, where the pickup truck is one of the most popular vehicles for moving about the large land areas thereof. Repairs to machinery that break down in the field are never close to a repair shop and frequently the use of hand tools will facilitate the repairs.

The prior art abounds with different types of tool boxes which are adapted to be used with pickup trucks as for example, U.S. Pat. No. 3,640,423 issued to S. L. Parker et al on Feb. 8, 1972. In order to keep the hand tools even more accessible, the farm machinery itself has been modified to provide the tool storage compartment, such as, for example, as disclosed in U.S. Pat. No. 3,058,771 issued to J. A. Hill et al on Oct. 16, 1962 and U.S. Pat. No. 2,797,957 issued to A. L. North on July 2, 1957.

The present invention seeks to overcome the problems associated with the prior art by providing a tool box and storage compartment which may be installed under the hood of vehicles and provides internal illumination and an electrical receptacle for use with external appliances.

SUMMARY OF THE INVENTION

Therefore, a primary object of the present invention is to provide a tool and storage compartment which may be installed under the hood of vehicles.

A further object of the present invention is to provide a self-illuminating tool box which can be used in darkness.

A still further object of the present invention is to provide a tool box which has an electrical receptacle for use with external appliances.

Still another object of the present invention is to provide a tool box and storage compartment which is safely hidden away and not accessible to individuals passing by.

Another object of the present invention is to provide a tool box which will keep the tools kept therein free from moisture and warm for convenient use in cold weather.

These objects, as well as, further objects and advantages of the present invention will become readily apparent after reading the description of a non-limiting illustrative embodiment and the accompanying drawing.

A tool and storage compartment adapted to be affixed under the hood of vehicles to the internal surface of the fender wheel covering according to the principles of the present invention, comprises; an elongated hollow body having a bottom and front and rear ends provided with fastening means for affixing the body to the internal surface of the vehicle fender wheel cover, the body having a plurality of sections and being provided with an electrical receptacle adapted to be connected to a source of electrical energy and a cover hingedly affixed to the rear end of the elongated body, the cover including illumination means coupled to a source of electrical energy via a switch activated by the switch upon the raising thereof.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
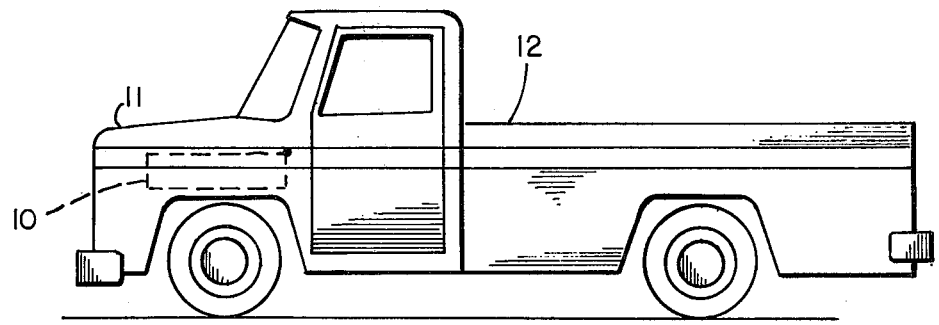
FIG. 1 is a pictorial representation of a pickup truck depicting the preferred location of the tool box and storage compartment, according to the principles of the present invention.
Figure 2:
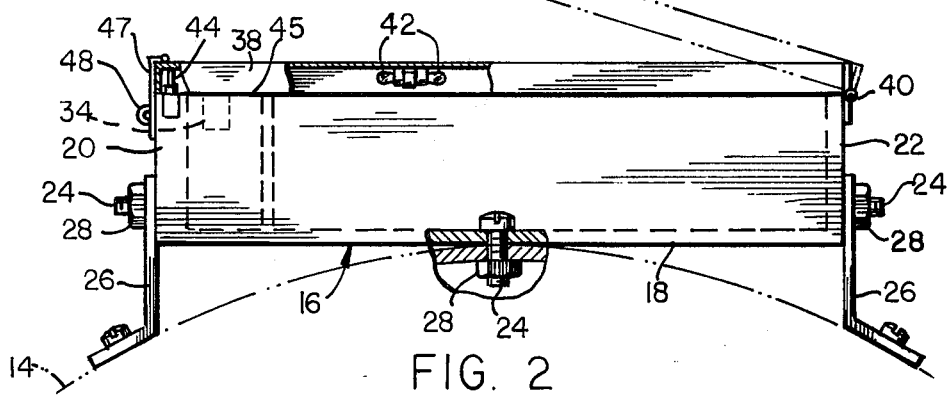
FIG. 2 is an enlarged view, partially in section, of the tool box affixed to the internal surface of the fender wheel cover.
Figure 3:
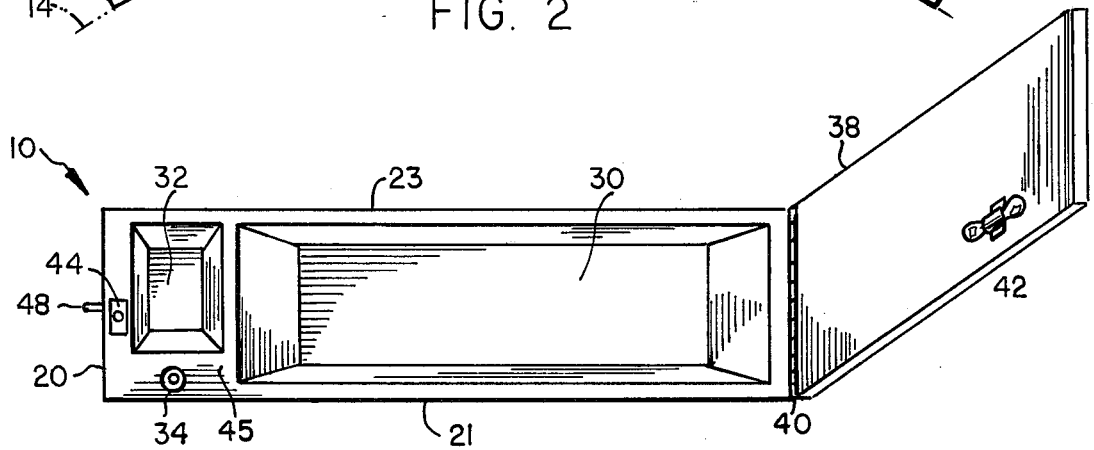
FIG. 3 is a top view of the tool box shown in FIG. 2 with the cover in an open position.

Referring now to the figures, and particularly to FIGS. 1, 2 and 3, there is shown a tool and storage compartment 10 disposed under the hood 11 of a vehicle 12 and affixed to the internal surface of the fender wheel cover 14.

The tool box 10 preferably includes an elongated hollow body 16 which has a bottom 18 and front and rear ends 20 and 22, respectively, and sides 21 and 23. The front and rear ends 20 and 22 and the bottom are provided with threaded studs 24 extending outwardly from their respective surfaces. A bracket 26 is provided with apertures adapted to receive the threaded studs 24 on the front and rear ends 20 and 22 and nuts 28 hold the bracket in position. The threaded stud 24 provided in the bottom 18 is inserted into an aperture that is provided in the vehicle fender wheel cover and is locked into position by a nut 28 in the same manner as bracket 26.

The body 17 of the storage compartment 10 is preferably divided into a large and small section 30 and 32, respectively. The large section 30 may be used for the storage of tools while the small section is ideal for storing nuts, bolts, springs, etc., that are needed frequently for repair and maintenance of machinery.

The body 16 is also provided with an electrical receptacle 34 such as a conventional cigarette lighter socket. The receptacle is wired, in a conventional manner, to the battery 36 of the vehicle 12 and functions as a source of electrical energy for external appliances which may be inserted therein, such as, a trouble light, electrical air pump, soldering iron, electric jack, etc..

The body 16 of the tool and storage compartment 10 is provided with a cover 38 which is operatively connected to the rear end 22 of the body 16 by a hinge 40 enabling the cover 38 to be raised and lowered. The hinged cover 38 may be provided with any number of conventional means, not shown, to keep it retained in the open position. However, the hinged or rear end 22 must always be placed proximate the hinged end of the vehicle hood 11 in order that closing of the vehicle hood 11 with the cover 38 open will automatically close the cover 38.

The cover 38 is also provided with illuminating means, such as, light bulbs 42 which are energized by a normally closed push-button switch 44 provided in the upper surface 45 of the body 16. The body 16 and cover 38 may also be provided with a hasp 47 and eye 48 to permit the use of a padlock, not shown, if desired.

Figure 4:
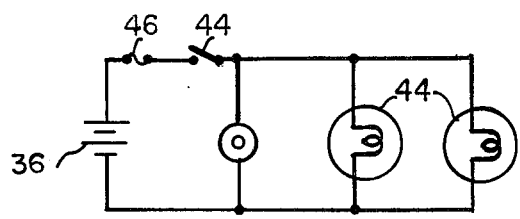
FIG. 4 is a schematic circuit diagram of the tool box.

Referring now to FIG. 4, which shows schematically the electrical wiring of the body 16 and cover 38 of the tool and storage compartment 10. The vehicle battery 36 is wired via a fuse 46, which may be conventional line type fuse, via a normally closed 44 switch to the light bulbs 42 and receptacle 34 which are electrically parallel.

In operation, the cover 38 is kept closed as shown in FIG. 2, thus, putting pressure on the push-button switch 44 keeping it open and breaking the electrical circuit. Raising cover 38 as shown in the dashed lines of FIG. 3 and in FIG. 3 takes the pressure off push-button switch 44 permitting it to close and complete the electrical circuit, thus, energizing bulbs 42. An appliance inserted into socket 34 is now capable of operation since the socket 34 is only energized when cover 38 is opened. Fuse 46 will protect the battery should a short circuit occur in the bulb sockets, wiring or external appliances.

Therefore, a primary advantage of the present invention is to provide a tool and storage compartment which may be installed under the hood of vehicles.

A further advantage of the present invention is to provide a self-illuminating tool box which can be used in darkness.

A still further advantage of the present invention is to provide a tool box which has an electrical receptacle for use with external appliances.

Still another advantage of the present invention is to provide a tool box and storage compartment which is safely hidden away and not accessible to individuals passing by.

Another advantage of the present invention is to provide a tool box which will keep the tools kept therein free from moisture and warm for convenient use in cold weather.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed is:

1. A tool and storage compartment adapted to be affixed under the hood of vehicles to the internal surface of the fender wheel cover, comprising:
an elongated hollow body having a bottom and front and rear ends provided with fastening means for affixing said body to the internal surface of the vehicle fender wheel cover, said body having a plurality of sections and being provided with an electrical receptacle, a cover, said cover, hingedly affixed to the rear end of said elongated body, said cover carrying said illumination means thereon, a switch, said switch secured to said body, means to electrically couple said receptacle and said illumination means to a source of electrical energy whereby said receptacle and said illumination means are energized by said source when said cover has a portion thereof hingedly disposed away from said body and whereby said switch and said illumination means and said receptacle are covered by said cover when said portion of said cover is disposed in a closed position adjacent said body, whereby said receptacle is de-energized when said cover is in said closed position.

2. A tool storage compartment according to claim 1 wherein said fastening means includes threaded studs means affixed to said front and rear ends proximate said bottom surface and extending outwardly therefrom, front and rear bracket means being provided with apertures for receiving said threaded studs and bolts extending through said fender wheel cover, and a plurality of nuts affixing said elongated body in position.

3. A tool and storage compartment according to claim 1 wherein said fastening means further includes a threaded stud affixed to said bottom and extending outwardly therefrom and into an aperture provided in said fender wheel cover and a locking nut for retaining said stud therein.

4. A tool and storage compartment according to claim 1 wherein said illumination means comprises a lamp.

5. A tool and storage compartment according to claim 1 wherein said illumination means is secured to a surface of said cover disposed adjacent said body when said cover is in said closed position.

6. A tool and storage compartment according to claim 1 wherein said receptacle is secured to said body at a location adjacent said cover when said cover is in said closed position.

7. A tool and storage compartment according to claim 1 further comprising covering means whereby said receptacle is inaccessable to a user when said cover is in said closed position.

8. A tool and storage compartment according to claim 1 further comprising said illumination means being de-energized when said cover is in said closed position.

9. A tool and storage compartment according to claim 1 wherein said hollow body is provided having an open mouth portion, said cover being disposed covering said open mouth portion when said cover is disposed in said closed position, said switch and said receptacle being secured to said body at a location adjacent said open mouth portion, said illumination means being disposed adjacent said open mouth portion when said cover is in said closed position, said cover covering said receptacle and said switch when said cover is in said closed position.

* * * * *